US012719841B2

(12) United States Patent
Choi et al.

(10) Patent No.: US 12,719,841 B2
(45) Date of Patent: Aug. 25, 2026

(54) METHOD FOR SECURE NETWORK COMMUNICATION AND SYSTEM THEREOF

(71) Applicants: SAMSUNG SDS CO., LTD., Seoul (KR); Korea Advanced Institute of Science and Technology, Daejeon (KR)

(72) Inventors: Kyu Young Choi, Seoul (KR); Beumjin Cho, Seoul (KR); Yoonchan Jhi, Seoul (KR); Hyojin Yoon, Seoul (KR); Jihoon Cho, Seoul (KR); Kyoungsoo Park, Daejeon (KR); Junghan Yoon, Daejeon (KR); Duckwoo Kim, Daejeon (KR); Seunghyun Do, Daejeon (KR)

(73) Assignees: SAMSUNG SDS CO., LTD., Seoul (KR); Korea Advanced Institute of Science and Technolgy, Daejeon (KR)

( * ) Notice: Subject to any disclaimer, the term of this patent is extended or adjusted under 35 U.S.C. 154(b) by 57 days.

(21) Appl. No.: 18/387,523

(22) Filed: Nov. 7, 2023

(65) Prior Publication Data

US 2024/0236055 A1 Jul. 11, 2024

(30) Foreign Application Priority Data

Jan. 5, 2023 (KR) ........................ 10-2023-0001494
Mar. 13, 2023 (KR) ........................ 10-2023-0032860

(51) Int. Cl.
*H04L 29/06* (2006.01)
*H04L 9/40* (2022.01)
*H04L 67/146* (2022.01)

(52) U.S. Cl.
CPC ...... *H04L 63/0435* (2013.01); *H04L 63/1425* (2013.01); *H04L 67/146* (2013.01)

(58) Field of Classification Search
CPC ........................ H04L 63/0435; H04L 63/1425; H04L 67/146
USPC ........................................................ 713/171
See application file for complete search history.

(56) References Cited

U.S. PATENT DOCUMENTS 6,732,269 B1 * 5/2004 Baskey ................. H04L 63/166 713/170
7,827,404 B1 * 11/2010 Freed ................. H04L 63/0428 713/168
8,397,059 B1 * 3/2013 Ferguson ............ H04L 63/0884 713/168

(Continued)

FOREIGN PATENT DOCUMENTS

KR 10-2212859 B1 2/2021

*Primary Examiner* — Bharat Barot
(74) *Attorney, Agent, or Firm* — NSIP Law

(57) ABSTRACT

The present disclosure relates to a secure network communication method and a system therefor. The secure network communication method using a proxy connecting a client and a server according to an embodiment of the present disclosure may include: receiving, from the client, a session encryption key shared for generation of a secure channel between the client and the server; and when a packet encrypted with the session encryption key and transmitted from the client to the server is received, decrypting the encrypted packet with the session encryption key and analyzing the decrypted packet, or forwarding the encrypted packet to the server without change of an encrypted state.

18 Claims, 15 Drawing Sheets

(56) References Cited

U.S. PATENT DOCUMENTS 8,583,914 B2 * 11/2013 Lev Ran ............ H04L 63/0428
713/153
9,176,838 B2 * 11/2015 Li ...................... H04L 63/0428
10,992,652 B2 * 4/2021 Putatunda .......... H04L 63/0464
2017/0187723 A1 * 6/2017 Islam ................. H04L 63/0428
2017/0289104 A1 * 10/2017 Shankar ............. H04L 63/0428
2020/0007503 A1 * 1/2020 Kogan ............... H04L 63/1425
2021/0352048 A1 * 11/2021 Guise, Jr. ........... H04L 63/0428

* cited by examiner

120
SERVER
HANDSHAKE
110
P
PROCESSOR
WRITE
SESSION ENCRYPTION KEY LOG
READ
AGENT
A
CALCULATE
SESSION ENCRYPTION KEY

NGINX TLS-TLS PROXY
THUNDER TLS (IDS)
THROUGHPUT [Gbps]
35
30
25
20
15
10
5
0
2.53
18.16
5.11
32.40
1 CORE
2 CORE
OF CORE

110
CLIENT
130
PROXY
120
SERVER
810
CIPHERTEXT
TAG
PLAINTEXT
830
820
840
845

110
CLIENT
910
920
940
930
950
960
CIPHERTEXT
TAG 1
TAG 2
PLAINTEXT
130
PROXY
910
940
930
950
960
955
CIPHERTEXT
TAG 1
TAG 2
PLAINTEXT
TAG 1
120
SERVER
910
920
940
930
950
960
955
965
CIPHERTEXT
TAG 1
TAG 2
PLAINTEXT
TAG 1
TAG 2

START
RECEIVE SESSION ENCRYPTION KEY
S1110
TRANSFER SESSION ENCRYPTION KEY TO LEADING CORE
S1120
STORE SESSION ENCRYPTION KEY IN GLOBAL TABLE
S1130
RECEIVE PACKET
S1140
TRANSFER PACKET TO WORKING CORE
S1150
DETECT SESSION ENCRYPTION KEY FOR DECRYPTING PACKET
S1160
COPY SESSION ENCRYPTION KEY TO LOCAL TABLE
S1170
DECRYPT PACKET BY USING SESSION ENCRYPTION KEY
S1180
END

PROXY
130
GLOBAL TABLE
1230
1220_1
CORE 1
1220_2
CORE 2
1220_3
CORE 3
...
1220_N
CORE N
PACKET
NIC
1210
SESSION ENCRYPTION KEY
SESSION ENCRYPTION KEY
120
SERVER
110
CLIENT

METHOD FOR SECURE NETWORK COMMUNICATION AND SYSTEM THEREOF

CROSS-REFERENCE TO RELATED APPLICATION (S)

This application claims priority to Korean Patent Application No. 10-2023-0001494 filed on Jan. 5, 2023 and Korean Patent Application No. 10-2023-0032860 filed on Mar. 13, 2023, in the Korean Intellectual Property Office, the entire contents of which are hereby incorporated by reference in its entirety.

BACKGROUND OF THE INVENTION

1. Field of the Invention

The present disclosure relates to a secure network communication and, particularly, a secure network communication method and a system therefor by which traffic processing performance can be improved while maintaining the stability of encryption/decryption for secure communication between a client and a server.

2. Description of the Prior Art

In order to implement secure communication between a client and a server, a proxy that detects a malicious code or an anomalous action against communication data between the client and the server may be used. That is, in a client-proxy-server model, a secure channel between a client and a proxy and a secure channel between the proxy and a server may be individually generated for communication between the client and the server.

When double secure channels are generated as described above, a proxy is required to additionally perform encryption and decryption for a packet, and thus the performance of a communication speed may be largely degraded. Moreover, when double secure channels are used, additional security vulnerabilities may be caused thereby.

SUMMARY OF THE INVENTION

An aspect of the present disclosure is to solve the above problem and other problems. Another aspect of the present disclosure is to provide a secure network communication method and a system therefor by which performance degradation caused by two secure channels provided in a client-proxy-server model and additional re-decryption resulting therefrom can be prevented.

Another aspect of the present disclosure is to provide a secure network communication method and a system therefor in which a client, a proxy, and a server share the same one session encryption key so that traffic processing performance can be improved.

Another aspect of the present disclosure is to provide a secure network communication method and a system therefor in which integrity of packet data transmitted or received between a client and a server may be verified using a tag.

Another aspect of the present disclosure is to provide a secure network communication method and a system therefor by which packet decryption performance in a proxy can be effectively improved using multiple cores.

In view of foregoing, an embodiment of the present disclosure provides a secure network communication method using a proxy connecting a client and a server, the method including: receiving, from the client, a session encryption key shared for generation of a secure channel between the client and the server; and when a packet encrypted with the session encryption key and transmitted from the client to the server is received, decrypting the encrypted packet with the session encryption key and analyzing the decrypted packet, or forwarding the encrypted packet to the server without change of an encrypted state.

Another embodiment of the present disclosure provides a proxy including a processor and providing secure network communication between a client and a server, wherein the processor is configured to execute: receiving, from the client, a session encryption key shared for generation of a secure channel between the client and the server; and when a packet encrypted with the session encryption key and transmitted from the client to the server is received, decrypting the encrypted packet with the session encryption key and analyzing the decrypted packet, or forwarding the encrypted packet to the server without change of an encrypted state.

Yet another embodiment of the present disclosure provides a computer-readable storage medium storing instructions configured to, when executed by a processor, cause a device including the processor to implement a particular operation, wherein the particular operation includes: receiving, from the client, a session encryption key shared for generation of a secure channel between the client and the server; and when a packet encrypted with the session encryption key and transmitted from the client to the server is received, decrypting the encrypted packet with the session encryption key and analyzing the decrypted packet, or forwarding the encrypted packet to the server without change of an encrypted state.

BRIEF DESCRIPTION OF THE DRAWINGS

The accompanying drawings are included as a part of the detailed description to help understanding of the present disclosure, and will be used to describe embodiments and technical features of the present disclosure together with the detailed description.

DETAILED DESCRIPTION OF THE EXEMPLARY EMBODIMENTS

Hereinafter, embodiments of the present disclosure will be described in detail with reference to the attached drawings. The same or similar elements are given the same reference numbers regardless of drawing symbols thereof, and redundant description thereof is omitted. The suffixes "module" and "unit" of elements mentioned in the following description are given and used together only for ease of specification writing, and thus do not have any distinguishable meanings or roles. That is, the term "unit" used herein refers to a software element or a hardware element, such as an FPGA or ASIC, and performs some roles. However, the "unit" does not always have a meaning limited to software or hardware. The "unit" may be configured either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. Functions provided in elements and "unit"s may be either combined into fewer elements and "unit"s, or distributed into additional elements and "unit"s.

In addition, in describing the embodiments disclosed herein, a detailed description of known relevant technologies will be omitted when it may make the subject matter of the embodiment disclosed herein rather unclear. In addition, the accompanying drawings are merely intended to facilitate understanding of the embodiments disclosed herein and not to restrict the technical spirit disclosed herein. In addition, the accompanying drawings should be understood as covering all modifications, equivalents, or alternatives included in the spirit and scope of the present disclosure.

The present disclosure proposes a secure network communication method and a system therefor by which performance degradation caused by two secure channels provided in a client-proxy-server model and additional re-decryption resulting therefrom can be prevented. In addition, the present disclosure proposes a secure network communication method and a system therefor in which a client, a proxy, and a server share the same one session encryption key so that traffic processing performance can be improved. In addition, the present disclosure proposes a secure network communication method and a system therefor in which integrity of packet data transmitted or received between a client and a server may be verified using a tag. In addition, the present disclosure proposes a secure network communication method and a system therefor by which packet decryption performance in a proxy can be effectively improved using multi cores.

Hereinafter, various embodiments of the present disclosure will be described in detail with reference to the accompanying drawings.

Figure 1:
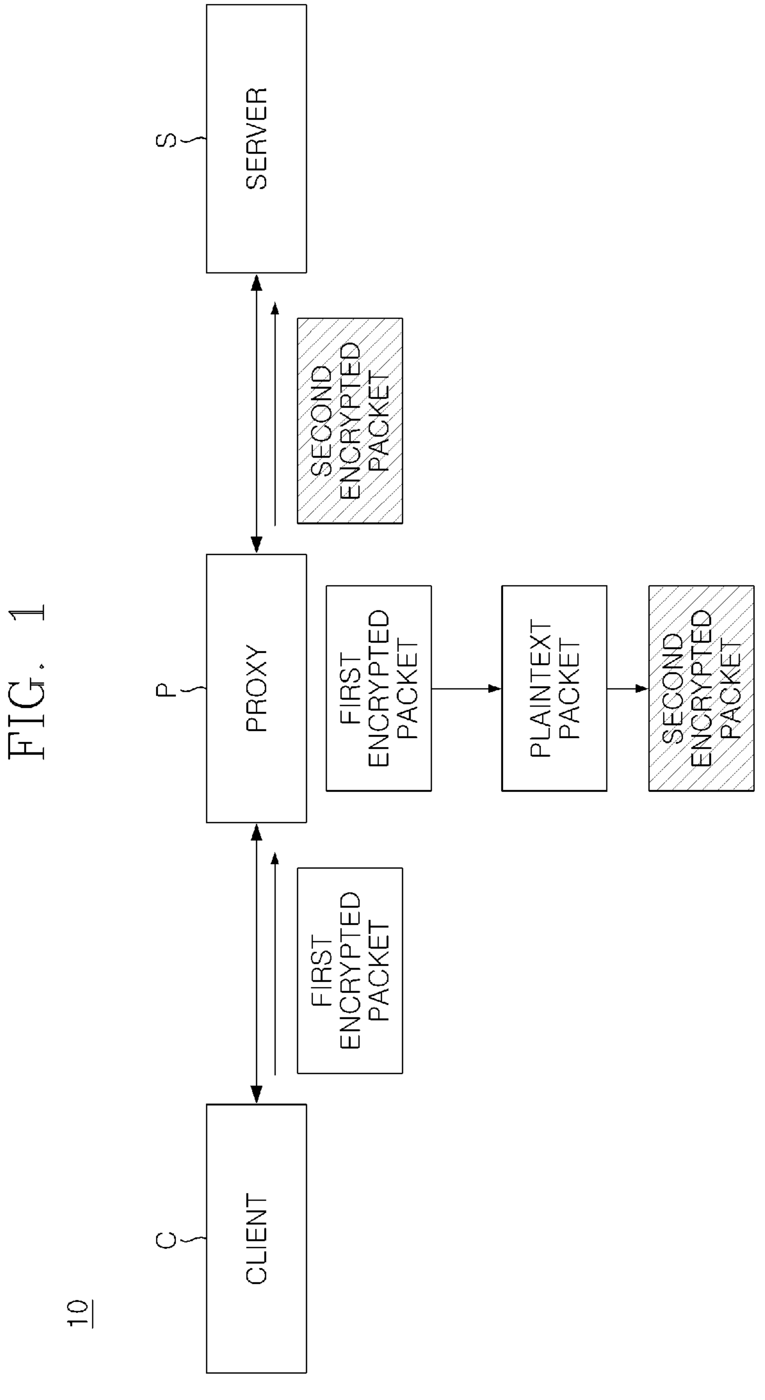
FIG. 1 is a block diagram illustrating a secure network communication system related to the present disclosure.

FIG. 1 is a block diagram illustrating a secure network communication system related to the present disclosure.

Referring to FIG. 1, a secure network communication system 10 related to the present disclosure may include a client C, a server S, and a proxy P.

The proxy P may relay a packet between the client C and the server S, and may perform packet analysis to detect a malicious code or an anomalous action included in each packet. When an anomaly is detected in a communication packet, the proxy P may block or remove the packet and perform various other actions.

In order to access the server S, the client C may perform a transport layer security (TLS) or secure socket layer (SSL) handshake protocol with the proxy P positioned therebetween, and share a first session encryption key, which is randomly generated, with the proxy P. In addition, the proxy P may perform a handshake protocol with the server S on behalf of the client C, and share a second session encryption key, which is randomly generated, with the server S. That is, the proxy P may generate a first secure channel using the first session encryption key with the client C, and generate a second secure channel using the second session encryption key with the server S.

Thereafter, the client C may encrypt a packet to be transmitted to the server S, with the first session encryption key, and transmit the encrypted packet to the proxy P. In this case, the proxy P may decrypt the packet with the first session encryption key, re-encrypt the decrypted packet with the second session encryption key, and transfer the re-encrypted packet to the server S. The proxy P may analyze the packet decrypted with the first session encryption key to detect a malicious code or an anomalous action. Thereafter, the server S may decrypt the encrypted packet by using the second session encryption key.

In addition, in a case where the server S transmits a packet to the client C, the same procedure may be performed reversely. That is, the server S may encrypt a packet with the second session encryption key and transmit the encrypted packet to the proxy P, and the proxy P may decrypt and re-encrypt the packet with the second session encryption key and the first session encryption key, and transmit the re-encrypted packet to the client C. Each of the first session encryption key and the second session encryption key may be a set of multiple keys rather than a single encryption key. Such the secure network communication system 10 may place the proxy P between the client C and the server S, and generate double secure channels. Accordingly, encryption and decryption of a packet is additionally performed and thus performance may be degraded, and this may be a main reason for delay of a service or data transmission. Moreover, there is a risk of additional security vulnerabilities arising due to double secure channels. In order to solve these problems, hereinafter, the present disclosure proposes a client-proxy-server model using one secure channel and one session encryption key.

<Secure Network Communication Method>

Figure 2:
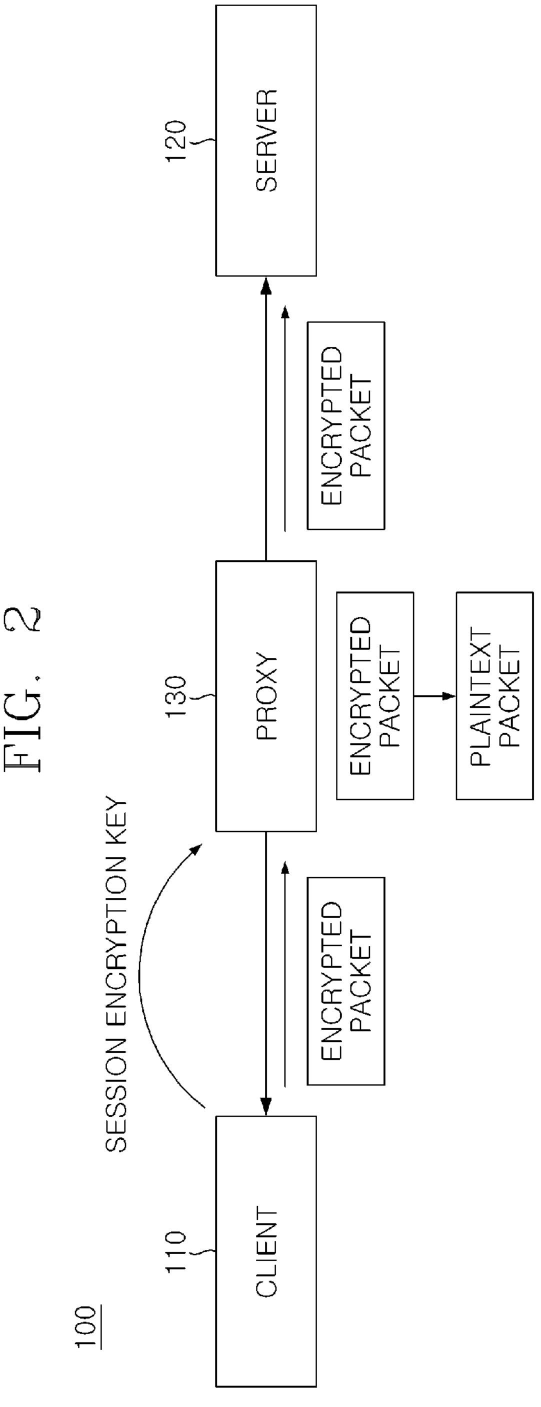
FIG. 2 is a block diagram illustrating a secure network communication system according to an embodiment of the present disclosure.

FIG. 2 is a block diagram illustrating a secure network communication system according to an embodiment of the present disclosure.

Referring to FIG. 2, a secure network communication system 100 according to an embodiment of the present disclosure may include a client 110, a server 120, and a proxy 130. Here, the proxy 130 may be called a middlebox.

The client 110 may perform a handshake protocol with the server 120 to access the server 120, and the client 110 may share a randomly generated session encryption key with the server 120. The proxy 130 may relay a handshake packet between the client 110 and the server 120, and may simply relay the packet with no direct involvement.

Thereafter, the proxy 130 may receive, from the client 110, the session encryption key shared for generation of a secure channel between the client 110 and the server 120. That is, the client 110, the server 120, and the proxy 130 may share the same session encryption key, and encrypt and decrypt a packet with one session encryption key. The proxy 130 may receive the session encryption key from the client 110 through a separate secure channel. For example, the proxy 130 may generate a new secure channel, such as a TLS channel, between the client 110 and the proxy 130, and then receive the session encryption key therethrough.

Thereafter, the proxy 130 may receive a packet transmitted to the server 130 from the client 110, and the packet may have been encrypted with the session encryption key. The proxy 130 stores the same session encryption key, and thus may decrypt the encrypted packet with the session encryption key, and analyze the decrypted packet. In addition, the proxy 130 may forward the received packet in an encrypted state to the server 120. That is, the proxy 130 may transmit the encrypted packet received from the client 110, to the server 120 without change. In this case, unlike the proxy in FIG. 1, the proxy 130 may omit an operation of encrypting a decrypted packet with a new encryption key again, and thus faster processing is possible.

Specifically, in a case where the proxy 130 supports an intrusion detection system (IDS), the proxy 130 may forward an encrypted packet to the server 120 first without change of the encrypted state. Thereafter, the proxy 130 may decrypt the encrypted packet with the session encryption key, and analyze the decrypted packet. That is, since intrusion detection is for detecting an anomalous action, packet blocking may not be performed. Therefore, an encrypted packet is preferentially forwarded, and then packet analysis may be performed.

Meanwhile, in a case where the proxy 130 supports an intrusion preventing system (IPS), the proxy 130 may first decrypt an encrypted packet with the session encryption key and then analyze the packet. Thereafter, when analysis of packets is completed, the proxy 130 may forward the encrypted packet to the server 120 without change of the encrypted state. Here, when a result of analyzing the decrypted packet indicates an abnormal action not being detected, the proxy 130 may forward the encrypted packet to the server 120. However, when an abnormal action is detected, the proxy 130 may block forwarding of the encrypted packet. That, when a malicious code or an anomalous action is detected in a packet, the proxy 130 supporting the IPS may block the packet from being transmitted to the server 120.

Additionally, the proxy 130 may perform a function of inspecting only a part of a received packet. For example, the proxy 130 may inspect only initial 128 KB of each packet, and in this case, may omit packet decryption and analysis, and perform only encrypted packet forwarding.

According to various embodiments of the present disclosure, the client 110 may further include a separate agent. That is, the client 110 may further include a dedicated agent A for extracting a session encryption key shared with the server 120, and transmitting same to the proxy 130.

Figure 3:
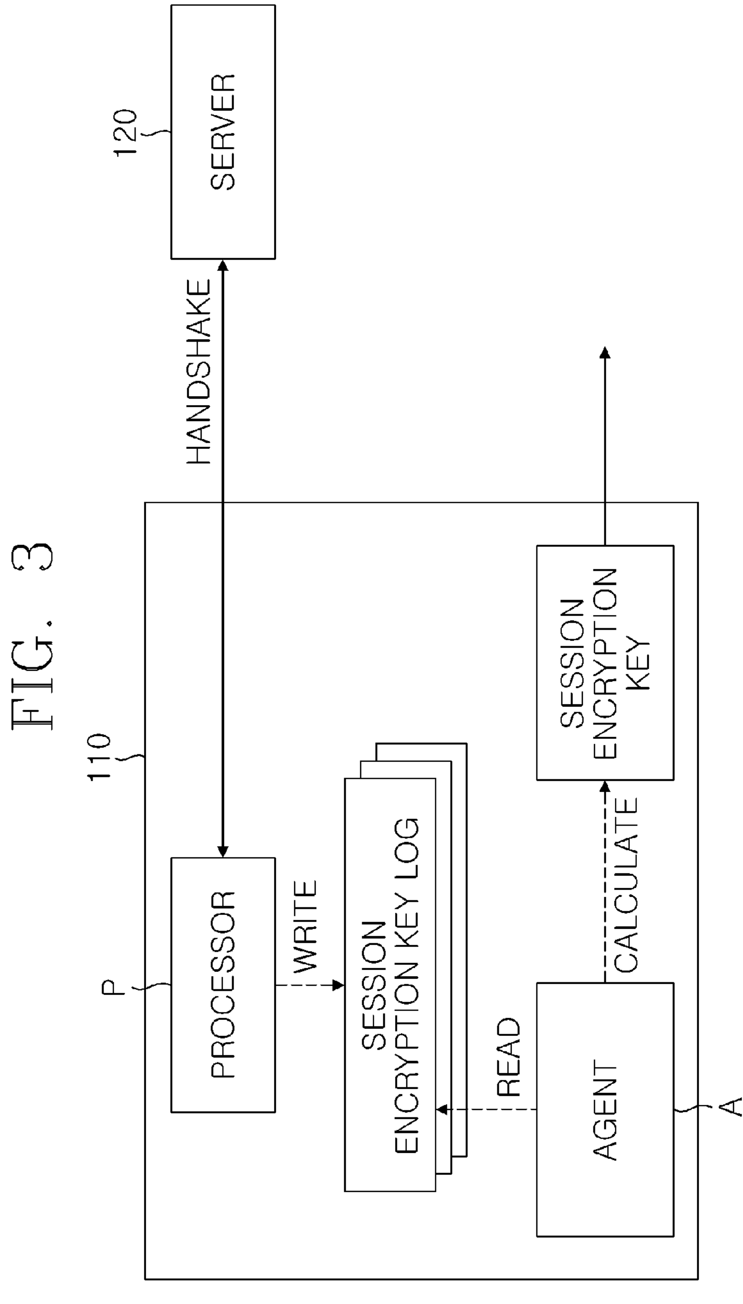
FIG. 3 is a diagram briefly illustrating generating a session encryption key by using an agent according to an embodiment of the present disclosure.

As illustrated in FIG. 3, the client 110 may perform a TLS handshake with the server 120, and generate a session encryption key shared with the server 120 accordingly. The client 110 may generate a session encryption key log for the shared session encryption key. The client 110 may write the session encryption key log in a network security service (NSS) format. However, the disclosure is not limited thereto, and it is also possible to write the session encryption key log in various formats other than the NSS format. Thereafter, the agent A may access the session encryption key log to obtain log information of the session encryption key, and may calculate the session encryption key shared between the client 110 and the server 120, based on the log information. According to an embodiment, the agent A may use "inotify ( )" to obtain the log information. Thereafter, the agent A may transmit the calculated session encryption key to the proxy 130. Additionally, according to an embodiment, the client 110 may be a web browser, and it is also possible to modify the web browser itself rather than including a separate agent, so as to implement a received session encryption key to be transmitted to the proxy 130.

As described above, a secure network communication system according to an embodiment of the present disclosure may enable a client, a proxy, and a server to share the same one session encryption key, thereby omitting a packet re-encryption process by the proxy and accordingly implementing improvement of communication performance. In addition, the secure network communication system may generate one secure channel between the client, the proxy, and the server, thereby removing security vulnerabilities which may occur when conventional double secure channels are used.

Figure 4:
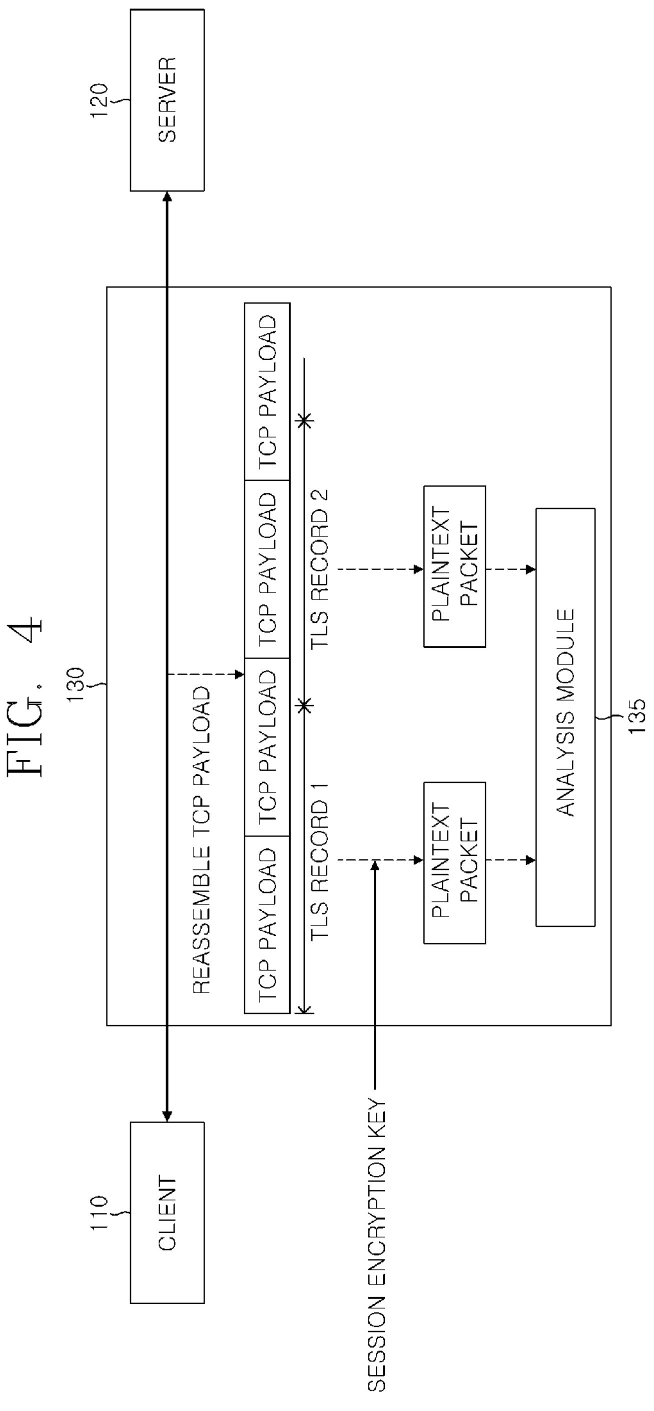
FIG. 4 is a diagram briefly illustrating an operation of a proxy according to an embodiment of the present disclosure.

FIG. 4 is a diagram briefly illustrating an operation of a proxy according to an embodiment of the present disclosure.

Referring to FIG. 4, the proxy 130 may first buffer packets transmitted and received between the client 110 and the server 120, in a sequence. The proxy 130 may recombine received TCP payloads. Thereafter, the proxy 130 may receive a session encryption key from the agent A of the client 110, and decrypt each TLS record. The each TLS record may be a unit of encryption or decryption by the client 110 or the server 120. Thereafter, the proxy 130 may perform analysis based on decrypted plaintext data, and may include a separate analysis module 135 for analysis according to some embodiments. The analysis module 135 may perform an IDS or IPS, and various other algorithms for detection of a malicious code or an anomalous action may be applied.

Figure 5:
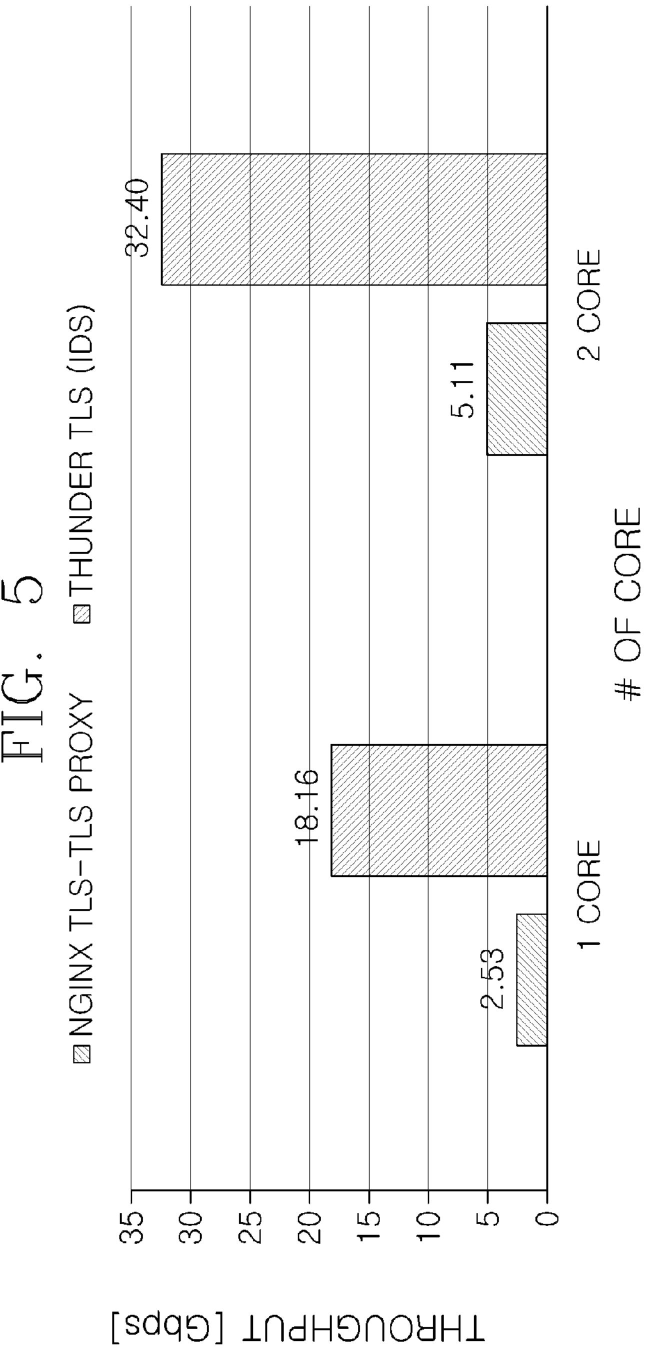
FIG. 5 and FIG. 6 are graphs s illustrating the performance of a secure network communication system according to an embodiment of the present disclosure.
Figure 6:
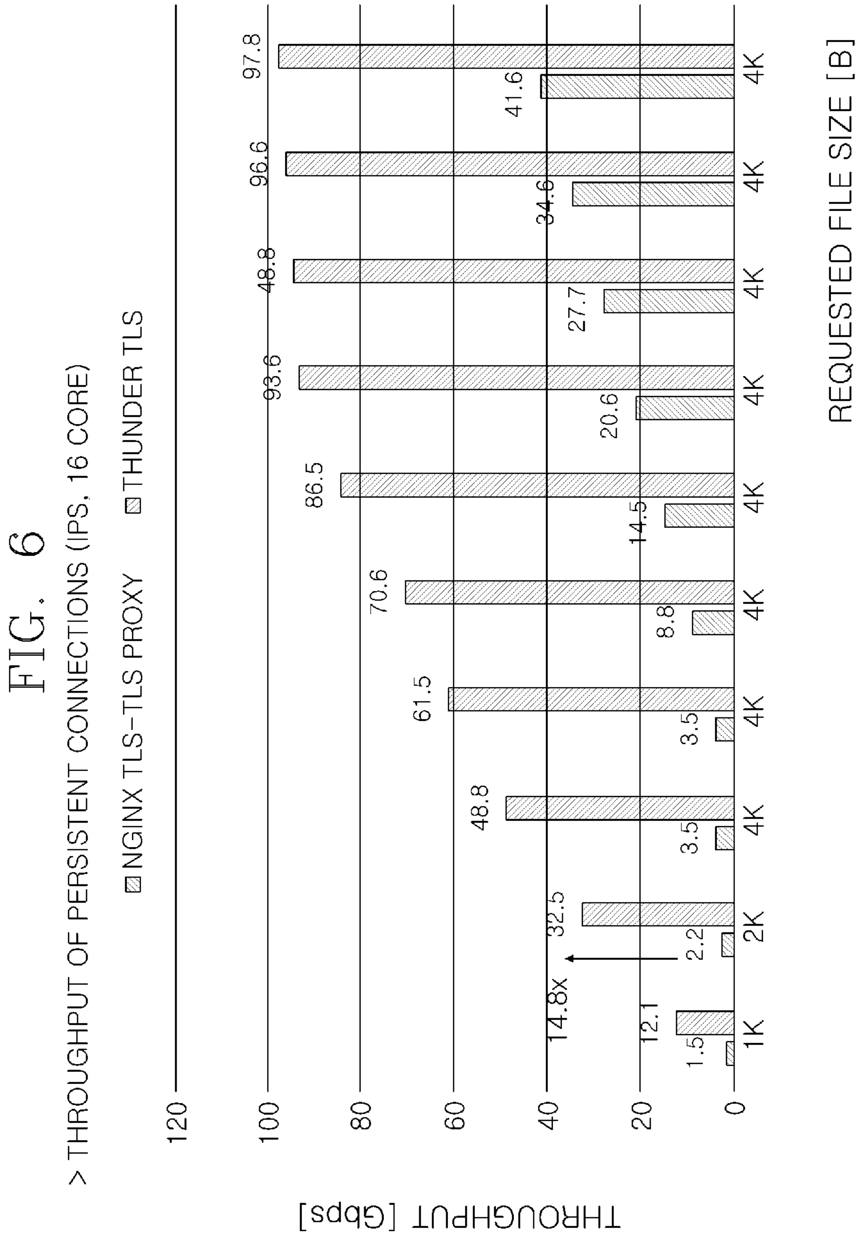

FIG. 5 and FIG. 6 are graphs illustrating the performance of a secure network communication system according to an embodiment of the present disclosure. A TLS-TLS proxy is the secure communication system of FIG. 1, and ThunderTLS corresponds to the secure communication system of FIG. 2.

Referring to FIG. 5, ThunderTLS has a throughput of 18.16 Gbps in a case of one core, and a throughput of 32.40 Gbps in a case of two cores. However, the TLS-TLS proxy has a throughput of 2.53 Gbps in a case of one core, and a throughput of 5.11 Gbps in a case of two cores. Therefore, in terms of throughput, it may be noted that the performance of ThunderTLS is exceptionally superior. In addition, referring to FIG. 6, even in terms of persistent connection, it may be noted that the throughput of ThunderTLS is remarkably outstanding compared to that of the TLS-TLS proxy.

Figure 7:
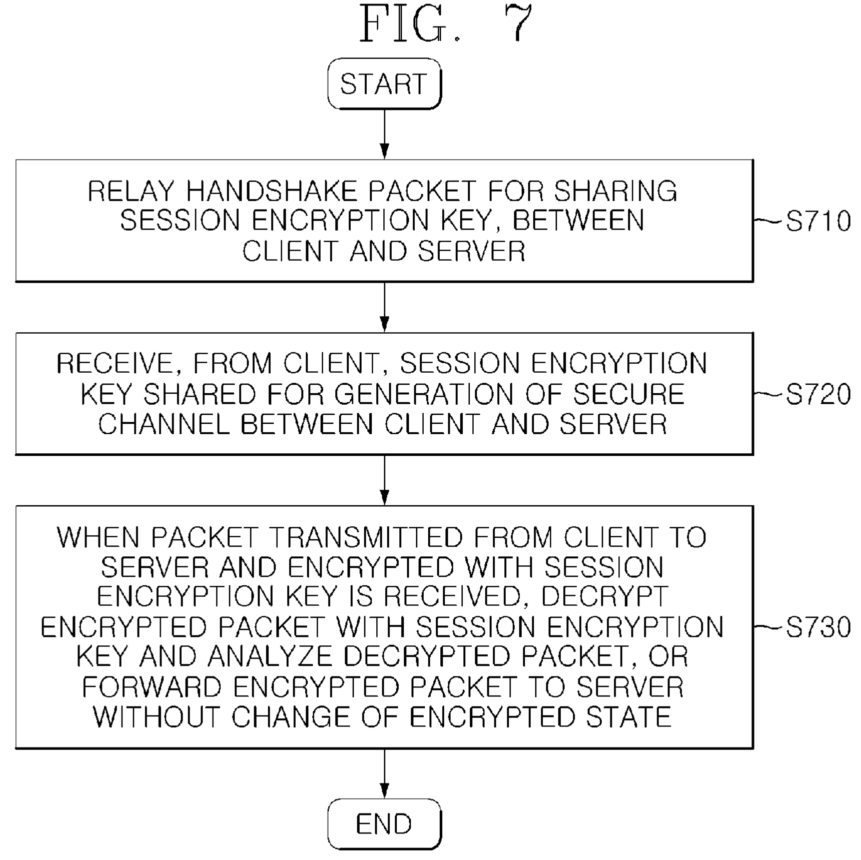
FIG. 7 is a flowchart illustrating a secure network communication method according to an embodiment of the present disclosure.

FIG. 7 is a flowchart illustrating a secure network communication method according to an embodiment of the present disclosure. Each operation of FIG. 7 may be performed by the proxy 130 of the secure network communication system 100 described above. In the illustrated flowchart, the secure network communication method is divided into multiple operations. However, at least some operations may be performed in a changed order, may be performed in combination with other operations, may be omitted, may be divided into detailed operations, or may be performed together with one or more operations not illustrated.

Referring to FIG. 7, the proxy 130 may relay a handshake packet for sharing a session encryption key, between the client 110 and the server 120 (operation S710). The client 110 may perform a handshake with the server 120 to access the server 120, and the client 110 may share a randomly generated session encryption key with the server 120. The proxy 130 may relay a corresponding handshake packet between the client 110 and the server 120, and may simply relay the packet with no direct involvement.

Thereafter, the proxy 130 may receive, from the client 110, the session encryption key shared for generation of a secure channel between the client 110 and the server 120 (operation S720). That is, the proxy 130 may share the same session encryption key as that shared between the client 110 and the server 120. According to some embodiments, the proxy 130 may receive the session encryption key from the client 110 through a separate secure channel, and may generate a new secure channel, such as a TLS channel, with the client 110 and receive the session encryption key therethrough.

The proxy 130 may receive an encrypted packet from the client 110, and in this case, the proxy 130 may decrypt the encrypted packet with the session encryption key and analyze the decrypted packet, or may forward the encrypted packet to the server 120 without change of the encrypted state (operation S730). That is, a packet received from the client 110 may have been encrypted with the session encryption key, and the same session encryption key is stored in the proxy 130. Therefore, the proxy 130 may use the session encryption key to decrypt the packet. Thereafter, the proxy 130 may analyze the decrypted packet. In addition, the proxy 130 may forward the received packet in an encrypted state to the server 120. The proxy 130 may transmit the encrypted packet received from the client 110, to the server 120 without change, and thus can omit an operation of encrypting a decrypted packet with a new encryption key again.

Meanwhile, in a case where the proxy 130 supports intrusion detection (IDS), the proxy 130 may forward the encrypted packet to the server 120 first without change of the encrypted state, then decrypt the encrypted packet with the session encryption key, and analyze the decrypted packet.

On the other hand, in a case where the proxy supports intrusion prevention (IPS), the proxy may first decrypt the encrypted packet with the session encryption key and then analyze the decrypted packet. Thereafter, when analysis of packets is completed, the proxy may forward the encrypted packet to the server without change of the encrypted state. That is, when a result of analyzing the decrypted packet indicates an abnormal action not being detected, the proxy may forward the encrypted packet to the server. However, when an abnormal action is detected, the proxy may block forwarding of the encrypted packet.

In some embodiments, a separate agent may be further included in the client 110, and the proxy 130 may receive the session encryption key from the agent in the client 110. The client 110 may generate a session encryption key log for the session encryption key shared with the server 120, and the agent may obtain log information on session encryption keys shared between the server 120 and the client 110 from session encryption key logs. Thereafter, the agent may extract a session encryption key between the server 120 and the client 110 from the log information, and transmit the extracted session encryption key to the proxy 130.

As described above, a secure network communication method according to an embodiment of the present disclosure may enable a client, a proxy, and a server to share the same one session encryption key, thereby omitting a packet re-encryption process by the proxy and accordingly implementing improvement of communication performance. In addition, the secure network communication method may generate one secure channel between the client, the proxy, and the server, thereby removing security vulnerabilities which may occur when conventional double secure channels are used.

<Packet Data Integrity Verification Method>

The client-proxy-server model 110 proposed in the present disclosure may verify the integrity of packet data (or called "session data") transmitted and received between the client 110 and the server 120, by using a tag. Hereinafter, a packet data integrity verification method in the client-proxy-server model 110 will be described in detail.

Figure 8:
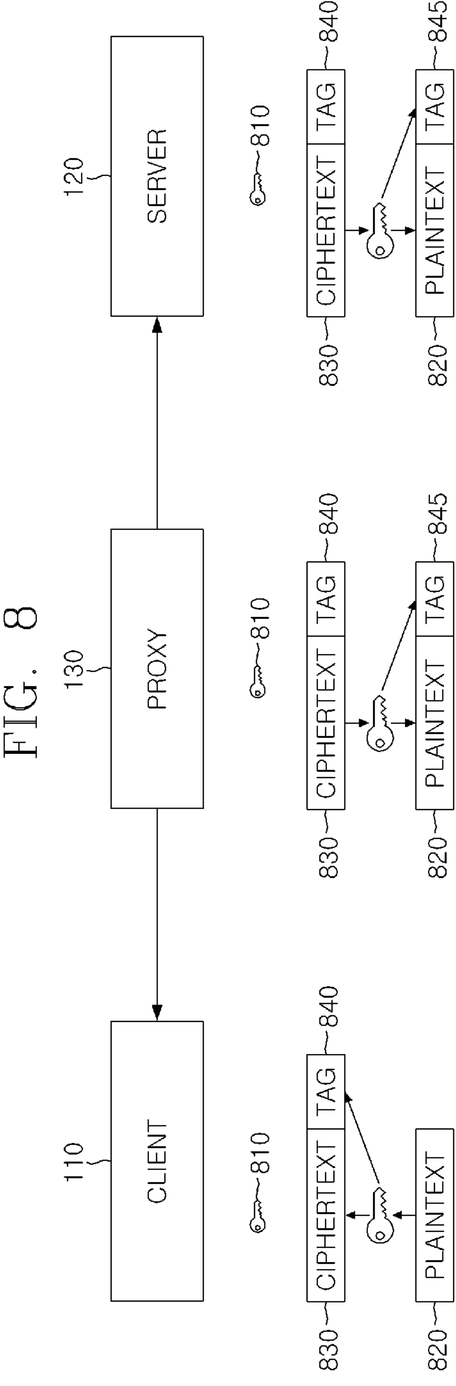
FIG. 8 is a diagram illustrating a packet data integrity verification method according to an embodiment of the present disclosure.

FIG. 8 is a diagram illustrating a packet data integrity verification method according to an embodiment of the present disclosure.

Referring to FIG. 8, the secure network communication system 100 according to the present disclosure may include the client 110, the server 120, and the proxy 130.

The client 110 may generate a secure channel between the client 110 and the server 120 through a handshake with the server 120, and share a session encryption key 810 with the server 120.

The client 110 may generate a separate secure channel for the proxy 130, and provide the session encryption key 810 to the proxy 130 through the secure channel. Accordingly, the client 110, the server 120, and the proxy 130 may share the same session encryption key 810, and encrypt and decrypt packet data with the one session encryption key 810. Hereinafter, in the present embodiment, for convenience of explanation, a packet data having not been encrypted or decrypted packet data is called "packet plaintext data", and encrypted packet data is called "packet ciphertext data".

The client 110 may encrypt packet plaintext data (plaintext) 820 to be transmitted to the server 120, with the session encryption key 810 thereby generating packet ciphertext data (ciphertext) 830. The client 110 may generate a tag 840 for verifying the integrity of packet data, by using the packet plaintext data 820 and the session encryption key 810. The tag 840 may be a kind of hash value.

The client 110 may combine the tag 840 with the packet ciphertext data 830 and transmit the tag 840 and the packet ciphertext data 830 to the proxy 130.

The proxy 130 may forward the packet ciphertext data 830 combined with the tag 840 to the server 120.

The proxy 130 may decrypt the packet ciphertext data 830 with the session encryption key 810 to obtain the packet plaintext data 820. In addition, the proxy 130 may use the packet ciphertext data 830 and the session encryption key 810 to obtain a tag 845.

The proxy 130 may compare the tag 840 received from the client 110 with the tag 845 obtained using the session encryption key 810, to verify the integrity of the packet data.

The server 120 may receive the packet ciphertext data 830 combined with the tag 840 from the proxy 130. Similarly, the server 120 may decrypt the packet ciphertext data 830 with the session encryption key 810 to obtain the packet plaintext data 820. In addition, the server 120 may use the packet ciphertext data 830 and the session encryption key 810 to obtain the tag 845.

The server 120 may compare the tag 840 received from the proxy 130 with the tag 845 obtained using the session encryption key 810, to verify the integrity of the packet data.

As described above, the client-proxy-server model 100 according to the present disclosure may use a tag generated using a session encryption key to verify the integrity of packet data transmitted and received among the client 110, the proxy 130, and the server 120.

However, when the proxy 130 forges/falsifies packet data in the structure of the model 100, the server is unable to completely ensure the integrity of the packet data even with a tag described above. Therefore, a packet data integrity verification method for solving this problem is required.

Figure 9:
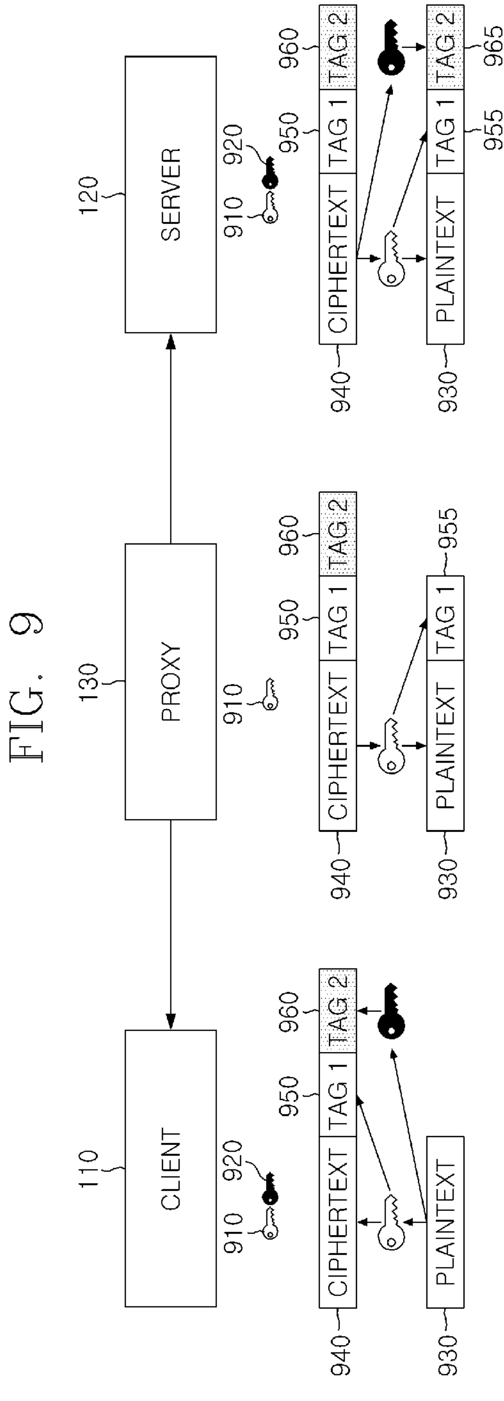
FIG. 9 is a diagram illustrating a packet data integrity verification method according to another embodiment of the present disclosure.

FIG. 9 is a diagram illustrating a packet data integrity verification method according to another embodiment of the present disclosure.

Referring to FIG. 9, the secure network communication system 100 according to the present disclosure may include the client 110, the server 120, and the proxy 130.

The client 110 may generate a secure channel between the client 110 and the server 120 through a handshake with the server 120, and share a session encryption key 1110 with the server 120. The client 110 may share, with the server 120, a tag encryption key 920 for verifying the integrity of packet data, together with the session encryption key 910.

The client 110 may generate a separate secure channel for the proxy 130, and provide only the session encryption key 910 to the proxy 130 through the secure channel. Accordingly, the client 110, the server 120, and the proxy 130 may share the same session encryption key 910.

The client 110 may encrypt packet plaintext data 930 to be transmitted to the server 120, with the session encryption key 910 thereby generating packet ciphertext data 940. The client 110 may generate a first tag 950 for verifying the integrity of packet data, by using the packet plaintext data 930 and the session encryption key 910. In addition, the client 110 may generate a second tag 960 for verifying the integrity of the packet data, by using the packet plaintext data 930 and the tag encryption key 920. The first and second tags 950 and 960 may be a kind of hash value.

The client 110 may combine the first and second tags 950 and 960 with the packet ciphertext data 940, and transmit the first and second tags 950 and 960 and the packet ciphertext data 940 to the proxy 130.

The proxy 130 may forward the packet ciphertext data 940 combined with the first and second tags 950 and 960 to the server 120.

The proxy 130 may decrypt the packet ciphertext data 940 with the session encryption key 910 to obtain the packet plaintext data 930. In addition, the proxy 130 may use the packet ciphertext data 940 and the session encryption key 910 to obtain a first tag 955. However, the proxy 130 does not have the tag encryption key 920, and thus is unable to obtain a second tag 965.

The proxy 130 may compare the first tag 950 received from the client 110 with the first tag 955 obtained using the session encryption key 910, to verify the integrity of the packet data.

The server 120 may receive the packet ciphertext data 940 combined with the first and second tags 950 and 960 from the proxy 130. Similarly, the server 120 may decrypt the packet ciphertext data 940 with the session encryption key 910 to obtain the packet plaintext data 930. In addition, the server 120 may use the packet ciphertext data 940 and the session encryption key 910 to obtain the first tag 955.

The server 120 may compare the first tag 950 received from the proxy 130 with the first tag 955 obtained using the session encryption key 910, to primarily verify the integrity of the packet data.

Thereafter, the server 120 may use the packet ciphertext data 940 and the tag encryption key 920 to obtain the second tag 965. The server 120 may compare the second tag 960 received from the proxy 130 with the second tag 965 obtained using the tag encryption key 920, to secondarily verify the integrity of the packet data. That is, the server 120 may use the second tag 965 generated using the tag encryption key 920, to identify whether the packet data is forged/falsified by the proxy 130.

As described above, the client-proxy-server model 100 according to the present disclosure may generate an additional tag by using a tag encryption key shared only between the client and the server, combine the additional tag with packet ciphertext data, and transmit the additional tag and the packet ciphertext data, so that the model can verify in real time whether packet data is forged/falsified by the proxy positioned between the client and the server.

<Packet Decryption Method in Proxy>

The proxy 130 of the client-proxy-server model 100 according to the present disclosure is required to evenly use several cores so as to efficiently perform packet decryption. To this end, the proxy 130 may perform load distribution processing between multiple cores by using receive-side scaling (RSS) that is a network driver technology. That is, such RSS is a technique that hashes four-tuple information (source IP, source port, destination IP, and destination port) of a TCP/TLS session, and may perform a role of evenly distributing loads to multiple cores by mapping a particular session to a particular CPU core.

However, the client-proxy-server model 100 according to the present disclosure establishes a secure channel for packet transmission/reception through a handshake between the client 110 and the server 120, and forms a separate secure channel for transmitting/receiving a session encryption key between the client 110 and the proxy 130. The proxy 130 of the model 100 receives a session encryption key through a separate secure channel, and thus has an RSS hash value different from that of a secure channel for packet reception. That is, the proxy recognizes a communication session for reception of a packet to be different from a communication session for reception of a session encryption key, and thus allocates the packet and the session encryption key to different CPU cores.

Figure 10:
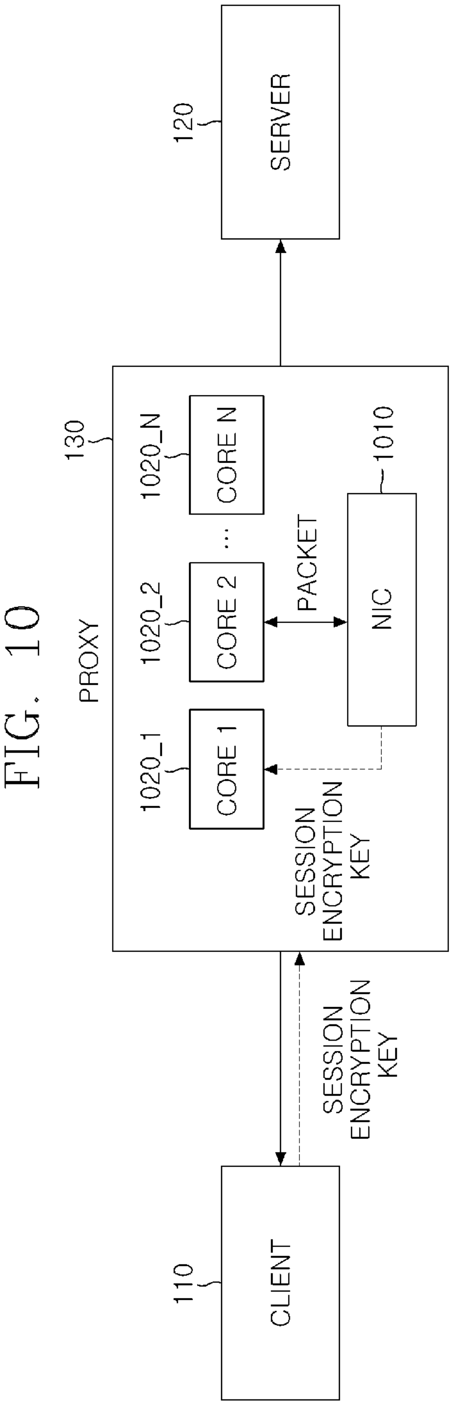
FIG. 10 is a diagram referenced to explain a problem of degradation of packet decryption performance in a proxy supporting multiple cores.

For example, as illustrated in FIG. 10, when a session encryption key is received through a secure channel configured between the client 110 and the proxy 130, the proxy 130 may assign the session encryption key to CPU core 1 1020_1 by using a network interface card (NIC) 1010. Thereafter, when a packet related to a corresponding session is received through a secure channel established between the client 110 and the server 120, the proxy 130 may allocate the packet to CPU core 2 1020_2 by using the NIC 1010. In this case, CPU core 2 1020_2 does not have a session encryption key for decrypting the packet, and thus is required to bring the session encryption key from CPU core 1 1020_1 through a separate key transfer mechanism. Therefore, packet decryption performance in the proxy is largely degraded. Therefore, a method for improving packet decryption performance by efficiently using multi cores of a proxy is required.

Figure 11:
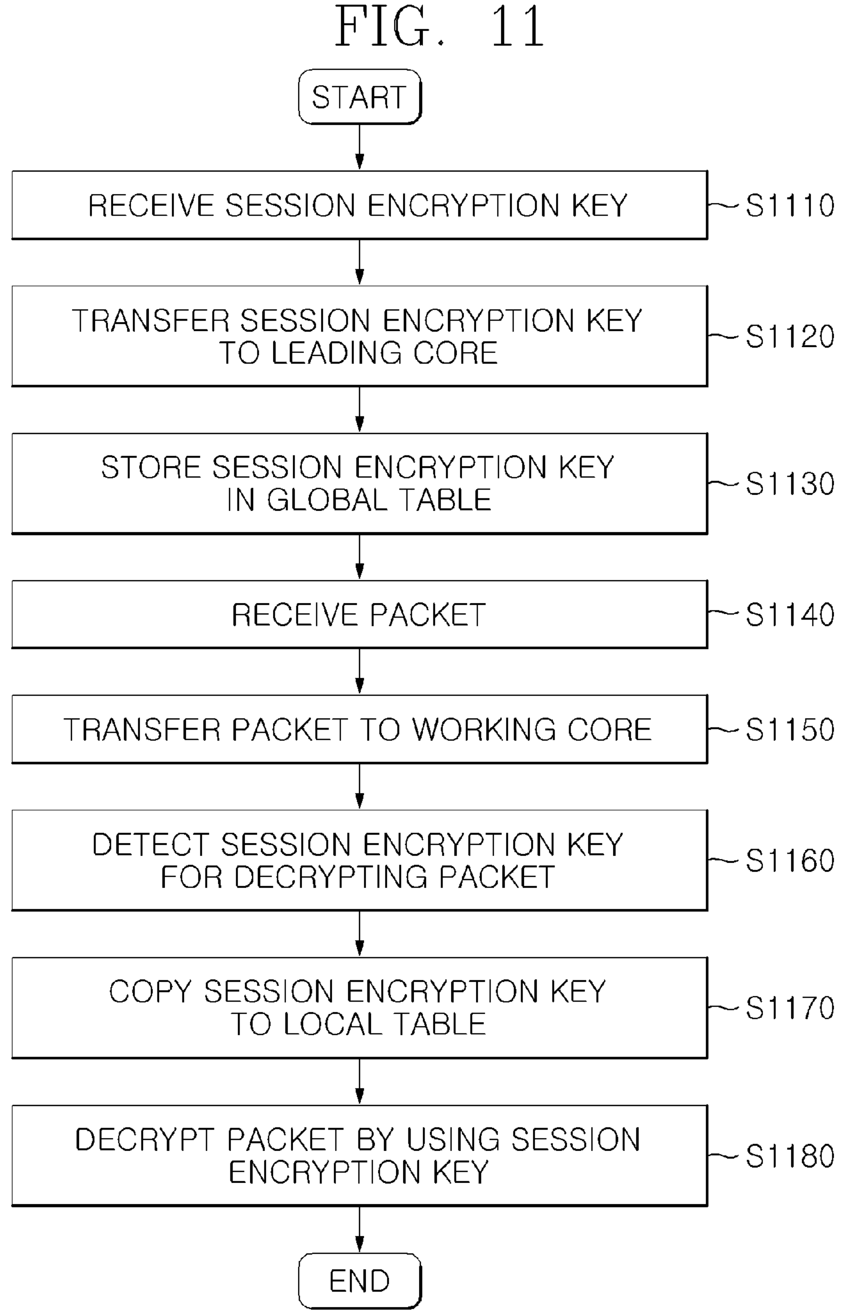
FIG. 11 and FIG. 12 are diagrams illustrating a packet decryption method according to an embodiment of the present disclosure.
Figure 12:
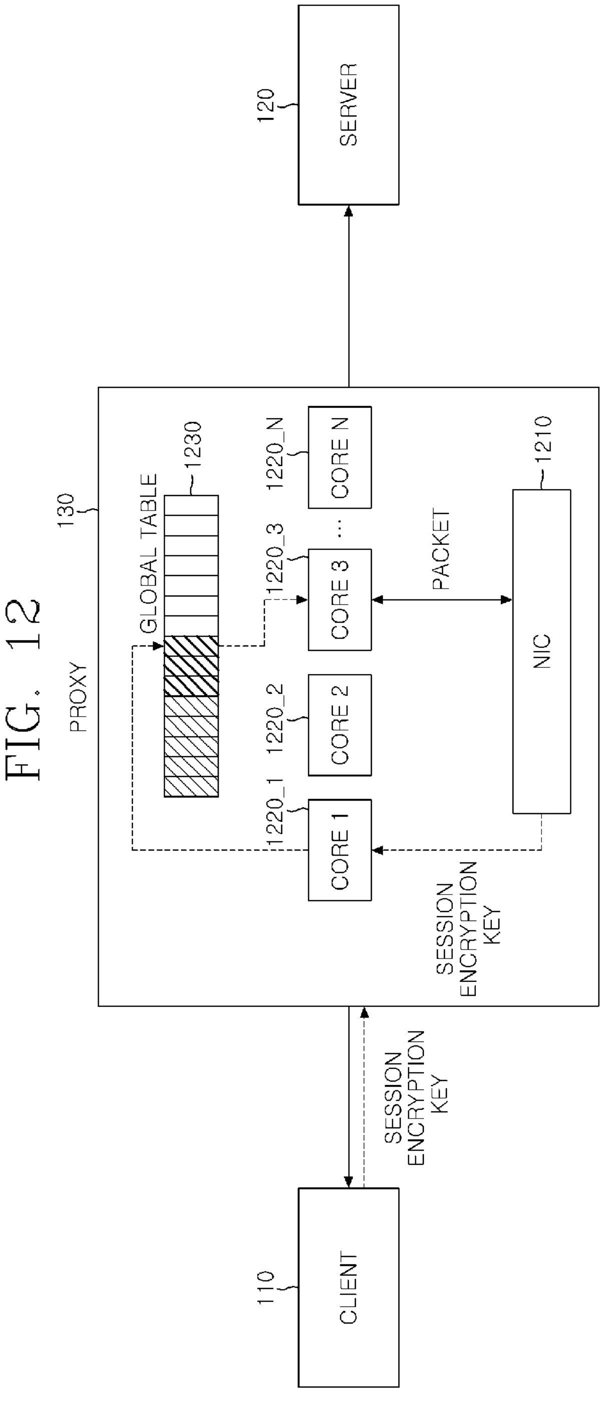

FIG. 11 and FIG. 12 are diagrams illustrating a packet decryption method according to an embodiment of the present disclosure. The packet decryption method according to the present embodiment may be performed by the proxy 130. In the illustrated flowchart, a packet decryption method is divided into multiple operations. However, at least some operations may be performed in a changed order, may be performed in combination with other operations, may be omitted, may be divided into detailed operations, or may be performed together with one or more operations not illustrated.

Referring to FIG. 11 and FIG. 12, the proxy 130 according to an embodiment of the present disclosure may include one network interface unit 1210 and multiple CPU cores 1220_1-1220_N.

The network interface unit 1210 may provide a communication interface for the client 110 and the server 120. The network interface unit 1210 may perform load distribution processing between the multiple cores by using receive-side scaling (RSS). The network interface unit 1210 may be a network interface card (NIC).

The multiple CPU cores 1220_1-1220_N may include one leading core and multiple working cores. That is, one 1220_1 of the multiple CPU cores 1220_1-1220_N may be configured as a leading core, and the remaining cores 1220_2-1220_N may be configured as working cores. Here, the leading core 1220_1 may perform a function of managing a session encryption key, and the working cores 1220_2-1220_N may perform a function of decrypting a packet by using the session encryption key. Hereinafter, in the present embodiment, an example in which CPU core 1 is a leading core will be described.

The network interface unit 1210 may receive a session encryption key shared between the client 110 and the server 120 from the client 110 when a communication session is configured between the client 110 and the server 120 (operation S1110). The client 110 may transmit the session encryption key through a separate secure channel (e.g., TLS channel) to the network interface unit 1210.

The network interface unit 1210 may transfer the session encryption key received from the client 110, to a leading core (operation S1120). For example, as illustrated in FIG. 12, the network interface unit 1210 may transfer the session encryption key to core 1 1220_1 configured as a leading core.

A FlowDirect rule may be installed in the network interface unit 1210 so that, every time a communication session is configured between the client 110 and the server 120, a session encryption key of the communication session is always transferred to the leading core. Alternatively, when the client transmits a session encryption key to a particular port of the proxy, the network interface unit 1210 may always transfer the session encryption key received through the particular port, to the leading core.

The leading core 1220_1 may store the session encryption key received from the network interface unit 1210, in a global table 1230 (operation S1130). The leading core 1220_1 may operate as a TLS server.

The global table 1230 may be a session encryption key queue for sequentially storing multiple session encryption keys. The global table 1230 may be implemented in a storage (not illustrated) of the proxy 130.

Thereafter, the network interface unit 1210 may receive an encrypted packet from the client 110 through a secure channel configured between the client 110 and the server 120 (operation S1140).

The network interface unit 1210 may transfer the packet received from the client 110, to one of the multiple working cores (operation S1150). The network interface unit 1210 may determine a working core to which the packet is to be allocated, by using RSS. For example, as illustrated in FIG. 12, the network interface unit 1210 may transfer the encrypted packet to core 3 1220_3 that is one of the multiple working cores.

The working core 1220_3 may access the global table 1230 to detect a session encryption key to be used to decrypt the packet (operation S1160). As another embodiment, the working core 1220_3 may periodically access to the global table 1230 to search for a session encryption key related to a communication session being managed by the working core 1220_3.

The working core 1220_3 may copy the detected session encryption key and store the copied session encryption key in a local table (not illustrated) of the working core 1220_3 (operation S1170). The local table may be a session encryption key queue for storing one or more session encryption keys. The local table may be implemented in each CPU core.

The working core 1220_3 may use the session encryption key stored in the local table to decrypt the encrypted packet (operation S1180). The working core 1220_3 may perform a packet analysis function or a packet forwarding function.

As described above, in the packet decryption method according to an embodiment of the present disclosure, one of multiple CPU cores is configured as a leading core that manages a session encryption key, and the remaining cores other than the leading core are configured as working cores, so that packet decryption performance of the proxy can be improved in proportion to the number of the working cores. However, the packet decryption method is problematic in that a leading core performs only a function of managing a session encryption key, and thus the resources of the leading core are wasted.

Figure 13:
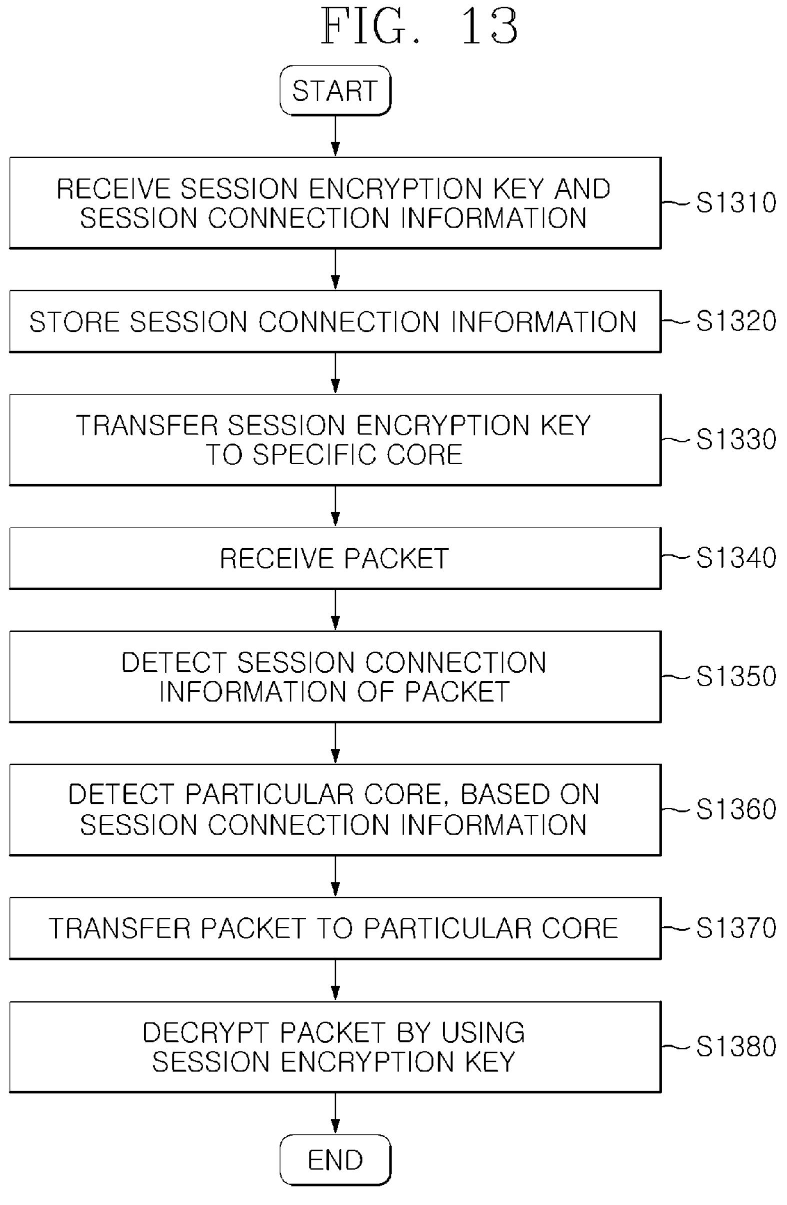
FIG. 13 and FIG. 14 are diagrams illustrating a packet decryption method according to another embodiment of the present disclosure.
Figure 14:
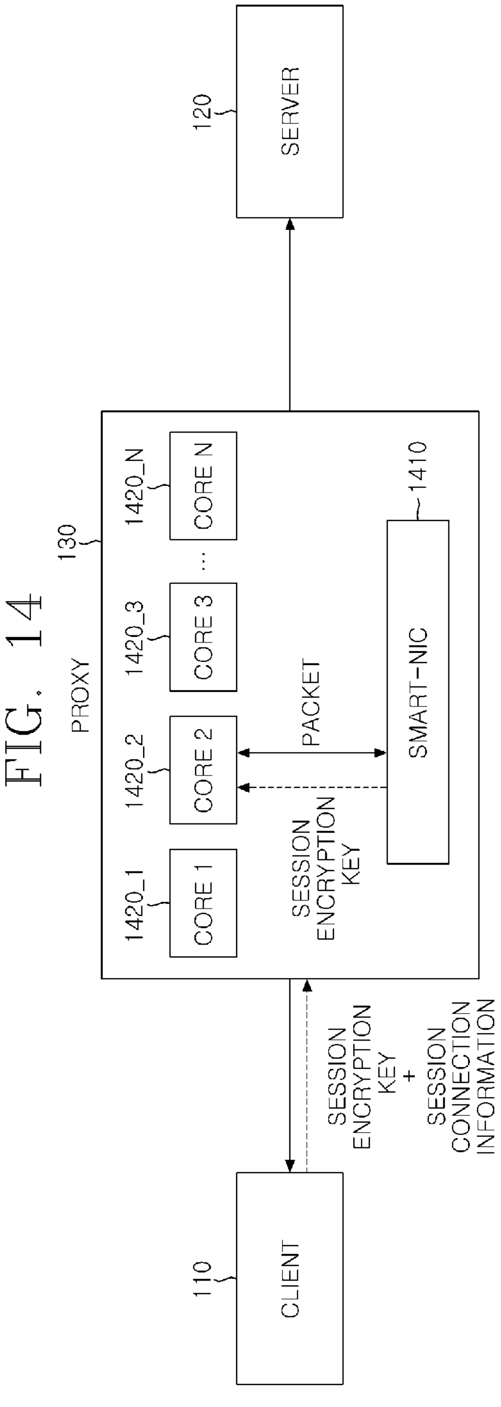

FIG. 13 and FIG. 14 are diagrams illustrating a packet decryption method according to another embodiment of the present disclosure. The packet decryption method according to the present embodiment may be performed by the proxy 130. In the illustrated flowchart, the packet decryption method is divided into multiple operations. However, at least some operations may be performed in a changed order, may be performed in combination with other operations, may be omitted, may be divided into detailed operations, or may be performed together with one or more operations not illustrated.

Referring to FIG. 13 and FIG. 14, the proxy 130 according to another embodiment of the present disclosure may include one network interface unit 1410 and multiple CPU cores 1420_1-1420_N.

The network interface unit 1410 may provide a communication interface for the client 110 and the server 120. The network interface unit 1410 may perform load distribution processing between the multiple cores by using receive-side scaling (RSS). The network interface unit 1410 may be a smart network interface card (smart-NIC) having computing resources unlike the network interface unit 1210 of FIG. 12. The smart-NIC 1410 may include a data processing unit (DPU).

The multiple CPU cores 1420_1-1420_N may perform a function of decrypting a packet by using a session encryption key. In addition, the multiple CPU cores 1420_1-1420_N may analyze a decrypted packet to detect a malicious code or an anomalous action.

The network interface unit 1410 may receive a session encryption key and session connection information from the client 110 when a communication session is configured between the client 110 and the server 120 (operation S1310). The client 110 may transmit the session encryption key and the session connection information through a separate secure channel (e.g., TLS channel) to the network interface unit 1410. The network interface unit 1410 may operate as an endpoint TLS server.

The session connection information is information for connecting a communication session between the client 110 and the server 120, and may include client IP information, client port information, server IP information, and server port information. The session connection information may be called "four-tuple information".

The network interface unit 1410 may store the session connection information received from the client 110, in an internal memory (not illustrated) (operation S1320). The network interface unit 1410 may store the session connection information in associated with the session encryption key.

The network interface unit 1410 may transfer the session encryption key received from the client 110, to one 1420_2 of the multiple CPU cores (operation S1330). For example, as illustrated in FIG. 14, the network interface unit 1410 may transfer the session encryption key to core 2 1420_2 that is one of the multiple CPU cores.

The network interface unit 1410 may determine a CPU core to which the session encryption key is to be assigned, by using RSS. When the CPU core to which the session encryption key is to be assigned is determined, the network interface unit 1410 may transfer the session encryption key by using a user datagram protocol (UDP) or a remote direct memory access (RDMA) protocol.

The network interface unit 1410 may store, in the internal memory, information on the CPU core 1420_2 to which the session encryption key has been assigned. The CPU core 1420_2 may store the session encryption key received from the network interface unit 1410, in an internal memory (not illustrated).

Thereafter, the network interface unit 1410 may receive an encrypted packet from the client 110 through a secure channel configured between the client 110 and the server 120 (operation S1340). The packet may include the session connection information (i.e., four-tuple information) between the client 110 and the server 120.

The network interface unit 1410 may detect the session connection information of the received packet (operation S1350).

The network interface unit 1410 may detect information on a session encryption key corresponding to the detected session connection information, based on the session connection information pre-stored in the internal memory, and detect information on a CPU core to which the session encryption key has been assigned, based on the detected information (operation S1360). For example, as illustrated in FIG. 14, the network interface unit 1410 may detect to CPU core 2 1420_2 to which the session encryption key has been assigned, based on the four-tuple information stored in the internal memory.

The network interface unit 1410 may transfer the encrypted packet to the detected CPU core 1420_2 (operation S1370). Accordingly, the CPU core 1420_2 may sequentially receive the session encryption key and the packet related to the communication session configured between the client 110 and the server 120.

The CPU core 1420_2 may decrypt the encrypted packet by using the previously received session encryption key (operation S1380). The CPU core 1420_2 may perform a packet analysis function or a packet forwarding function.

As described above, in the packet decryption method according to another embodiment of the present disclosure, a smart-NIC is used to transmit, to the same CPU core, a session encryption key and a packet related to a communication session configured between the client 110 and the server 120, so that packet decryption performance of the proxy can be improved in proportion to the number of multiple CPU cores.

Figure 15:
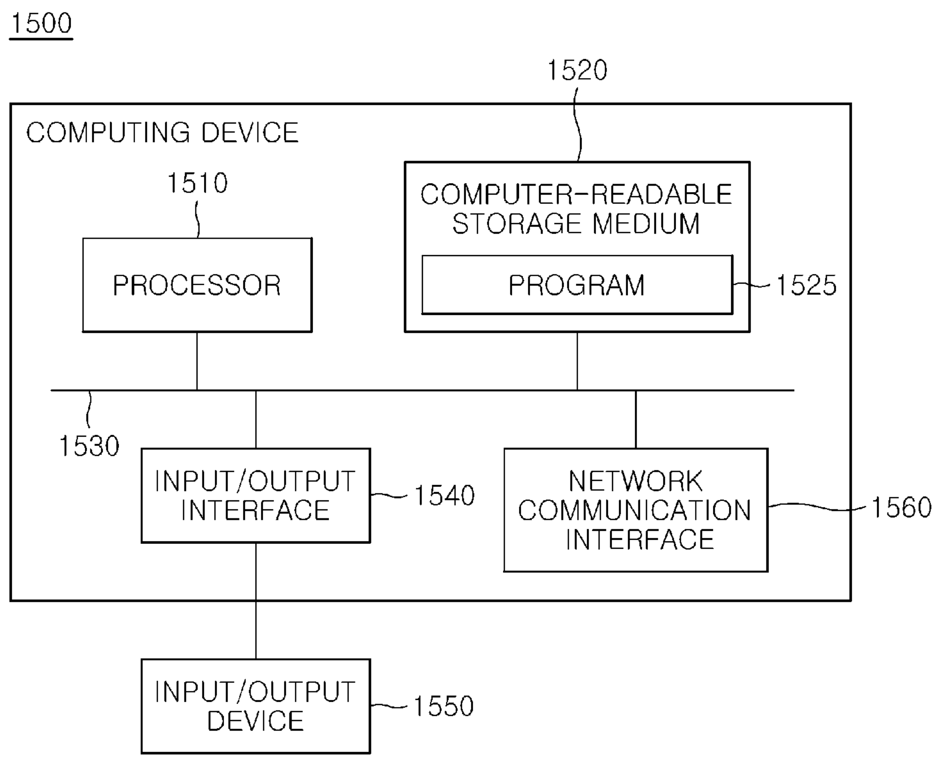
FIG. 15 is a block diagram illustrating a configuration of a computing device according to an embodiment of the present disclosure.

FIG. 15 is a block diagram illustrating a configuration of a computing device according to an embodiment of the present disclosure.

Referring to FIG. 15, a computing device 1500 according to an embodiment of the present disclosure may include at least one processor 1510, a computer-readable storage medium 1520, and a communication bus 1530. The computing device 1500 may be one or more components included in the proxy 130 or elements configuring the proxy 130.

The processor 1510 may cause the computing device 1500 to operate according to an illustrative embodiment mentioned above. For example, the processor 1510 may execute one or more programs 1525 stored in the computer-readable storage medium 1520. The one or more programs may include one or more computer-executable instructions, and the computer-executable instructions may be configured to, when executed by the processor 1510, cause the computing device 1500 to perform operations according to an illustrative embodiment.

The computer-readable storage medium 1520 may be configured to store a computer-executable instruction or a program code, program data, and/or other proper types of information. The programs 1525 stored in the computer-readable storage medium 1520 include a set of instructions executable by the processor 1510. In an embodiment, the computer-readable storage medium 1520 may be a memory (a volatile memory such as a random access memory, a non-volatile memory, or a proper combination thereof), one or more magnetic disk storage devices, optical disk storage devices, flash memory devices, other types of storage mediums capable of being accessed by the computing device 1500 and storing desired information, or a proper combination thereof.

The communication bus 1530 may interconnect various other components of the computing device 1500, including the processor 1510 and the computer-readable storage medium 1520.

The computing device 1500 may further include one or more input/output interfaces 1540 that provide an interface for one or more input/output devices 1550, and one or more network communication interfaces 1560. The input/output interface 1540 and the network communication interface 1560 are connected to the communication bus 1530.

The input/output device 1550 may be connected to other components of the computing device 1500 through the input/output interface 1540. An example of the input/output device 1550 may include input devices, such as a pointing device (a mouse or a trackpad), a keyboard, a touch input device (a touchpad or a touch screen), a voice or sound input device, various types of sensor devices, and/or an image capturing device, and/or output devices, such as a display device, a printer, a speaker, and/or a network card. An example of the input/output device 1550 may be included in the computing device 1500 as a component configuring the computing device 1500, or may be connected to the computing device 1500 as a separate device distinguished from the computing device 1500.

The effects of a secure network communication method and a system therefor according to embodiments of the present disclosure are as follows.

According to at least one of the embodiments of the present disclosure, a client, a proxy, and a server share the same one session encryption key, and thus additional re-encryption of a packet can be omitted and communication performance can be extraordinarily improved accordingly.

In addition, according to at least one of the embodiments of the present disclosure, one secure channel is established between a client, a proxy, and a server, so that security vulnerabilities which may occur when conventional double secure channels are used can be removed.

In addition, according to at least one of the embodiments of the present disclosure, a tag encryption key shared only between a client and a server may be used to generate an additional tag, and the additional tag is combined with packet ciphertext data and is then transmitted together therewith, so that whether packet data is forged/falsified can be verified in real time by a proxy positioned between the client and the server.

In addition, according to at least one of the embodiments of the present disclosure, one of multiple CPU cores is configured as a leading core that manages a session encryption key, and the remaining cores other than the leading core are configured as working cores, so that packet decryption performance of the proxy can be improved in proportion to the number of the working cores.

In addition, according to at least one of the embodiments of the present disclosure, a smart-NIC is used to transmit, to the same CPU core, a session encryption key and a packet related to a communication session configured between a client and a server so that packet decryption performance of a proxy can be improved in proportion to the number of multiple CPU cores.

However, effects acquirable by a secure network communication method and a system therefor according to embodiments of the present disclosure are not limited to the effects described above, and other effects that have not been mentioned may be clearly understood by a person who has common knowledge in the technical field to which the present disclosure belongs, from the following description.

The present disclosure described above can be implemented as a computer-readable code in a medium having a program recorded thereon. A computer-readable medium may continuously store or temporarily store a computer-executable program to be executed or downloaded. Moreover, the medium may be various recording means or storage means in the form of a single hardware or a combination of multiple hardware, and is not limited to a medium directly connected to a computer system, but may be dispersed on a network. Examples of the medium may include a magnetic medium, such as a hard disk, a floppy disk, and a magnetic tape, an optical recording medium, such as CD-ROM and DVD, a magneto-optical medium, such as a floptical disk, and a medium configured to store a program instruction, which includes a ROM, a RAM, flash memory, and the like. Furthermore, examples of other media may be recording media or storage media managed by an app store that distributes applications, or a site or server that supplies or distributes various other software. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

The present disclosure is not limited by the above embodiments and the appended drawings. It will be apparent to those skilled in the art that substitutions, modifications, and changes of elements according to the present disclosure can be made within the scope without departing from the technical spirit of the present disclosure.

What is claimed is:

1. A secure network communication method using a proxy connecting a client and a server, the method comprising:
   - receiving, by the proxy, from the client, a session encryption key shared between the client and the server for generation of a secure channel between the client and the server;
   - receiving, by the proxy, a packet encrypted with the session encryption key and transmitted from the client to the server;
   - forwarding, by the proxy, the encrypted packet to the server without change of an encrypted state as an initial operation;
   - determining, by the proxy, whether a predefined security inspection condition is satisfied while the encrypted packet is forwarded without decryption; and
   - decrypting, by the proxy, the encrypted packet with the session encryption key and analyzing the decrypted packet only when the predefined security inspection condition is satisfied,
   - wherein the secure channel between the client and the server is maintained without establishing a separate secure channel between the proxy and the server.

2. The method of claim 1, further comprising relaying a handshake packet for sharing the session encryption key, between the client and the server.

3. The method of claim 1, wherein the receiving of the session encryption key comprises receiving the session encryption key from the client through a separate secure channel.

4. The method of claim 1, wherein when the proxy supports an intrusion preventing system (IPS), the encrypted packet is forwarded to the server without change of the encrypted state as the initial operation, and is decrypted with the session encryption key and analyzed by the intrusion prevention system only when the predefined security inspection condition is satisfied.

5. The method of claim 1, wherein the receiving of the session encryption key comprises receiving the session encryption key from an agent in the client, the agent obtaining log information on the session encryption key shared between the server and the client from a session encryption key log generated by the client, and extracting the session encryption key from the log information.

6. The method of claim 1, wherein first and second tags for data integrity verification are combined with the encrypted packet.

7. The method of claim 6, wherein the first tag is generated using packet plaintext data and the session encryption key, and
   - the second tag is generated using the packet plaintext data and a tag encryption key.

8. The method of claim 1, wherein the proxy comprises a network interface unit and multiple CPU cores.

9. The method of claim 8, further comprising:
   - when the network interface unit transfers the session encryption key received from the client to a leading core among the multiple CPU cores, storing, by the leading core, the session encryption key received from the network interface unit in a global table; and
   - when the network interface unit transfers a packet received from the client to a working core among the multiple CPU cores, decrypting, by the working core, the packet received from the network interface unit by using the session encryption key stored in the global table.

10. The method of claim 9, further comprising configuring one of the multiple CPU cores as the leading core, and configuring remaining cores other than the leading core as working cores.

11. The method of claim 8, further comprising:

receiving, by the network interface unit, first session connection information from the client together with the session encryption key; and when a packet is received from the client, detecting, by the network interface unit, second session connection information of the received packet, and transferring the received session encryption key and packet to a first core by using the first and second session connection information.

12. The method of claim 11, further comprising decrypting, by the first core, the received packet by using the session encryption key received from the network interface unit.

13. The method of claim 11, wherein the first and second session connection information comprises IP information and port information of the client and IP information and port information of the server.

14. A proxy comprising a processor and providing secure network communication between a client and a server, wherein the processor is configured to perform:

receiving, from the client, a session encryption key shared between the client and the server for generation of a secure channel between the client and the server;

receiving a packet encrypted with the session encryption key and transmitted from the client to the server;

forwarding the encrypted packet to the server without change of an encrypted state as an initial operation;

determining whether a predefined security inspection condition is satisfied while the encrypted packet is forwarded without decryption; and decrypting the encrypted packet with the session encryption key and analyzing the decrypted packet only when the predefined security inspection condition is satisfied, wherein the secure channel between the client and the server is maintained without establishing a separate secure channel between the proxy and the server.

15. The proxy of claim 14, wherein the receiving of the session encryption key comprises receiving the session encryption key from the client through a separate secure channel.

16. The proxy of claim 14, wherein, when the proxy supports an intrusion preventing system (IPS), the encrypted packet is forwarded to the server without change of the encrypted state as the initial operation, and is decrypted with the session encryption key and analyzed by the intrusion prevention system only when the predefined security inspection condition is satisfied.

17. The proxy of claim 14, wherein first and second tags for data integrity verification are combined with the encrypted packet.

18. A non-transitory computer-readable storage medium storing instructions configured to, when executed by a processor, cause a proxy comprising the processor to implement a specific operation, wherein the specific operation comprises:

receiving, from a client, a session encryption key shared between the client and the server for generation of a secure channel between the client and a server;

receiving a packet encrypted with the session encryption key and transmitted from the client to the server;

forwarding the encrypted packet to the server without change of an encrypted state as an initial operation;

determining whether a predefined security inspection condition is satisfied while the encrypted packet is forwarded without decryption; and decrypting the encrypted packet with the session encryption key and analyzing the decrypted packet only when the predefined security inspection condition is satisfied, wherein the secure channel between the client and the server is maintained without establishing a separate secure channel between the proxy and the server.

* * * * *